(12) United States Patent
Habboub (10) Patent No.: US 8,601,402 B1
(45) Date of Patent: Dec. 3, 2013

(54) SYSTEM FOR AND METHOD OF INTERFACING WITH A THREE DIMENSIONAL DISPLAY

(75) Inventor: Bassell Habboub, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1100 days.

(21) Appl. No.: 12/569,815

(22) Filed: Sep. 29, 2009

(51) Int. Cl.
*G06F 3/00* (2006.01)

(52) U.S. Cl.
USPC ............ 715/863; 715/848; 715/782; 715/810

(58) Field of Classification Search
USPC .................................. 715/863, 848, 782, 810
See application file for complete search history.

(56) References Cited

U.S. PATENT DOCUMENTS

| | | | | |
|---|---|---|---|---|
| 5,196,854 | A * | 3/1993 | Mathews | 342/26 B |
| 5,602,564 | A * | 2/1997 | Iwamura et al. | 715/782 |
| 7,027,898 | B1 * | 4/2006 | Leger et al. | 701/14 |
| 7,030,861 | B1 * | 4/2006 | Westerman et al. | 345/173 |
| 7,119,819 | B1 * | 10/2006 | Robertson et al. | 715/782 |
| 7,205,928 | B1 * | 4/2007 | Sweet | 342/26 B |
| 7,427,943 | B1 * | 9/2008 | Kronfeld et al. | 342/26 B |
| 7,864,161 | B2 * | 1/2011 | Hollemans et al. | 345/173 |
| 2003/0083804 | A1 * | 5/2003 | Pilley et al. | 701/120 |
| 2008/0024454 | A1 * | 1/2008 | Everest | 345/173 |
| 2010/0050133 | A1 * | 2/2010 | Nishihara et al. | 715/863 |
| 2010/0107127 | A1 * | 4/2010 | Han et al. | 715/848 |
| 2010/0241999 | A1 * | 9/2010 | Russ et al. | 715/863 |

OTHER PUBLICATIONS

3D Interface Specifications, White Paper, Philips 3D Solutions, 2005-2009 Philips Electronics Nederland B.V., dated Apr. 8, 2009, pp. 1-31.
Maunu, D.H., AS-3D Displays in Digital Signage, http://www.InsightMedia.Info, dated Mar. 5, 2009, pp. 1-31.
Seagull, F.J. and Wickens, C.D., Vitration in Command and Control Vehicles: Visual Performance, Manual Performance, and Motion Sickness: A Review of the Literature, Technical Report HFD-06-07/FEDLAB-06-01, dated Oct. 2006 on cover, but Mar. 1997 on text, 22 pages.

* cited by examiner

*Primary Examiner* — Michael Roswell
(74) *Attorney, Agent, or Firm* — Donna P. Suchy; Daniel M. Barbieri (57) ABSTRACT

An interface for a system includes a three dimensional display and a three dimensional touch screen. The interface includes processing electronics configured to receive information from a three dimensional touch screen and determine at least one of a grab and hold operation for an object displayed in three dimensional space, a zoom operation associated with a finger movement along a Z axis perpendicular to an XY plane of the three dimensional touch screen, a pick and placement operation for an object in three dimensional space, a switching operation associated with a two dimensional object getting three dimensional attributes when moved along the Z axis in a direction away from the XY plane of the screen, and a menu expansion operation associated with a finger movement along the Z axis.

20 Claims, 10 Drawing Sheets

SYSTEM FOR AND METHOD OF INTERFACING WITH A THREE DIMENSIONAL DISPLAY

BACKGROUND OF THE INVENTION

The present specification relates generally to the field of three dimensional sensing and three dimensional displays. More particularly, the present specification relates to interface techniques utilizing three dimensional displays and three dimensional sensing devices.

Three dimensional images can be provided by auto stereoscopic devices. For example, displays, such as liquid crystal displays (LCDs), LED displays, and CRT displays can display images or information in three dimensions by providing a left eye image and a right eye image through the use of shutters, lenses, color filters and polarizing filters. Proposed three dimensional display systems have discussed the use of autostereoscopic lens assemblies to produce three dimensional images (e.g., an autostereoscopic display).

Three dimensional sensing panels have also been utilized. Such panels can utilize various sensing techniques to determine the location of a finger, stylus, or other device/body port in three dimensional space. Three dimensional sensing panels have utilized optics, sound, and capacitance to sense an X, Y, Z location in three dimensions. Generally, the X, Y location is on a surface of the panel and the Z location is on a Z axis that extends perpendicular from the surface of the screen.

Heretofore, interfaces for three dimensional displays and for three dimensional sensing devices have not taken advantage of three dimensional sensing and imaging to optimize the display of information and control of the display and touch panel. Some conventional systems have attempted to provide a three dimensional look and feel for the user interface by stacking several windows and allowing navigating through them via a stacked card method for rotational browsing of multiple objects. The stack card method replaces a current object with the next object in the stack. However, these somewhat three dimensional navigational features are generally controlled by either using left/right arrows or swiping to the left and right using a two dimensional touch gesture. These two dimensional gestures are disadvantageous when trying to control three dimensional functions.

Heretofore, conventional touch screens have not been able to utilize traditional mouse type operations associated with conventional computer systems. Generally, commands sensed by conventional touch screens are limited to the action and moment of the touch that occurs on the touch panel.

Thus, there is a need for a touch panel with enhanced user experience and interface. Further, there is a need for a touch panel that provides real-time feedback as objects are "moused over." Yet further, there is a need to provide three dimensional attributes to objects that are "moused over" and return objects to their native two dimensional resolution when the finger or stylus moves away from the object. Further, there is a need for a system and method of interfacing with a three dimensional touch sensing and three dimensional display that is optimized for three dimensional sensing and viewing. Further, there is a need for a interface for three dimensional displays and three dimensional touch panels that provides menu expansion, object detailed information and status and/or advanced animation using Java and Flash software. Further still, there is a need for the use of a three dimensional display that allows navigating into and out of the display via three dimensional sensing. Further still, there is a need for an interface that allows an operator to grab an object displayed on a three dimensional display, pick it up and place it somewhere else on the screen, to delve into stacked windows, or to hold onto a stacked window and slide it from the stack.

SUMMARY OF THE INVENTION

An exemplary embodiment relates to an interface for a system including a three dimensional display and a three dimensional touch screen. The interface includes processing electronics configured to receive information from the three dimensional touch screen and determine at least one of a grab and hold operation for an object displayed in three dimensional space, a zoom operation associated with a finger movement along a Z axis perpendicular to an XY plane of the three dimensional touch screen, a pick and placement operation for an object in three dimensional space, a switching operation associated with a two dimensional object gaining three dimensional attributes when moved along the Z axis in a direction away from the XY plane on the screen, a mouse over operation wherein an object in a native two dimensional state gains three dimensional attributes when a finger is near the object and returns to the native two dimensional state when the finger moves away from the object, and a menu expansion operation associated with finger movement along the Z axis.

Another exemplary embodiment relates to a method of using a three dimensional display and three dimensional touch screen. The method includes receiving detection signals from the three dimensional touch screen. The method also includes determining a movement of finger from the detection signals. The method also includes moving an object displayed on the three dimensional display in response to the movement. The object is moved according to at least one of a grab and hold operation for the object in three dimensional space, a pick and placement operation for an object in three dimensional space, a switching operation associated with a two dimensional object gaining three dimensional attributes when moved along a Z axis perpendicular to an XY plane of the touch screen in a direction away from the XY plane, a mouse over operation wherein an object in a native two dimensional state gains three dimensional attributes when a finger is near the object and returns to the native two dimensional state when the finger moves away from the object, and a menu expansion operation associated with a finger movement along the Z axis.

Another exemplary embodiment relates to an apparatus. The apparatus includes means for providing two dimensional and three dimensional objects. The apparatus also includes means for sensing a position in movement in three dimensions. The apparatus further includes means for responding to the position in movement to change an object displayed in two dimensions to an object displayed in three dimensions.

BRIEF DESCRIPTION OF THE DRAWINGS

Exemplary embodiments will become more fully understood from the following detailed description, taken in conjunction with the accompanying drawings, wherein like reference numerals refer to like parts, and wherein.

DETAILED DESCRIPTION OF THE PREFERRED EMBODIMENTS

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
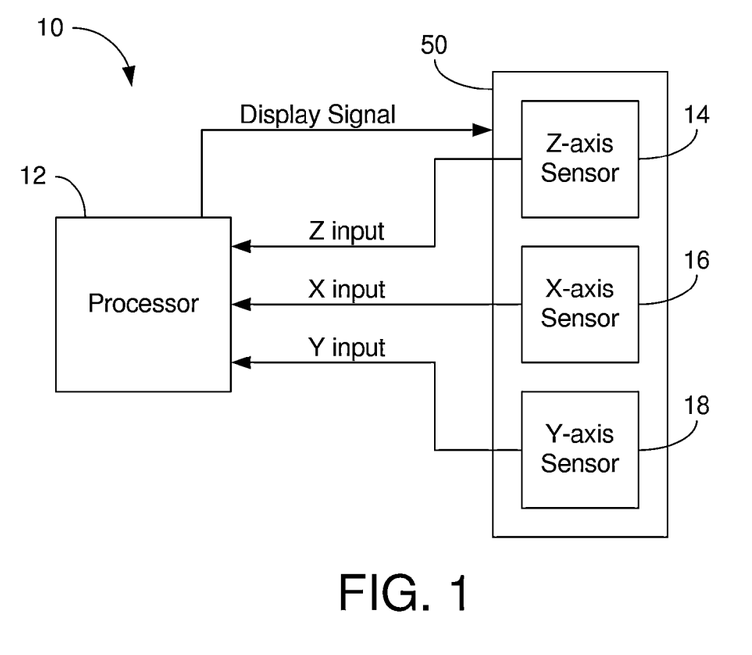
FIG. 1 is a general block diagram of a system including an interface for use with a three dimensional display and three dimensional touch screen.

With reference to FIG. 1, a system 10 includes a processor 12 and a three dimensional touch screen and three dimensional display 50. System 10 includes an advantageous interface that is optimized for three dimensional display and sensing.

Three dimensional touch screen and display 50 includes a Z axis sensor 14, an X axis sensor 16 and a Y axis sensor 18. Sensors 14, 16, 18 can be integrated with each other. Although shown as a single unit, screen and display 50 can be a separate display unit and a separate three dimensional sensor unit. Preferably, the touch screen portion of screen and display 50 is provided in front of the display portion of screen and display 50.

Processor 12 can be embodied as a computing platform including a processing device and at least one storage unit or memory. PC-type platforms, RISC machines, and other computer devices can be utilized as processors. A circuit board card can include the circuitry for performing the interface operations described below.

Touch screen and display 50 can be employed in a multitude of environments, including in CAD environments, avionic environments, navigation environments, targeting environments, synthetic vision environments, computing environments, medical environments, etc. In one embodiment, touch screen and display 50 are employed in a cockpit of an aircraft or as a head up display (HUD). In such an embodiment, the touch screen can be provided on a combiner or an element that is reachable by a pilot or other user.

Touch screen and display 50 can be comprised of a touch screen with Z-axis sensing disposed in front of a color stereoscope display capable of two dimensional and three dimensional images. The display can include holographic elements, auto stereoscopic images, microlenses, or stereograms for producing objects in three dimensions. The array of three dimensional image producing elements can be electronically controlled to transform two dimensional images on an LCD to three dimensional images.

Touch screen and display 50 can be capable operation in two dimensional and three dimensional modes. For example, touch screen and display 50 can include a liquid crystal display (LCD) and a switched transmissive device that enables two dimensional and three dimensional viewing. The transmissive device can be an autostereoscopic lenticular array or an electro-wetting device. Alternatively, screen and display 50 can be based upon other types of three dimensional displays and sensors.

Preferably, microlenses in front of the pixels of an LCD can be electronically controlled to provide three dimensional projection for portions of display 50 or objects on display 50. The microlenses can be controlled via the display signal. Preferably, processor 12 controls the microlenses to provide appropriate two dimensional and three dimensional images. In a preferred environment, the microlenses are arranged in an array so that particular objects and particular portions of the screen can be selected for providing three dimensional objects while the remaining portion of the touch screen and display 50 is in a native two dimensional mode. Microlenses can be controlled by controlling the voltages that provided to the microlenses via the display signal. The microlenses can be lithographically patterned over an array of liquid crystal pixel elements associated with an LCD.

Processor 12 preferably provides a display signal to touch screen and display 50 for providing two dimensional and three dimensional images. The display signal can control the display of two dimensional and three dimensional images, such as by controlling the autostereoscopic lenticular array. For example, the display signal could control sub-pixel microlenses, as well as the LCD.

Processor 12 can include a number of different circuits that may be integrated in one package, in separate packages, and in separate circuit boards. In one embodiment, processor 12 can be integrated within touch screen and display 50.

Figure 2:
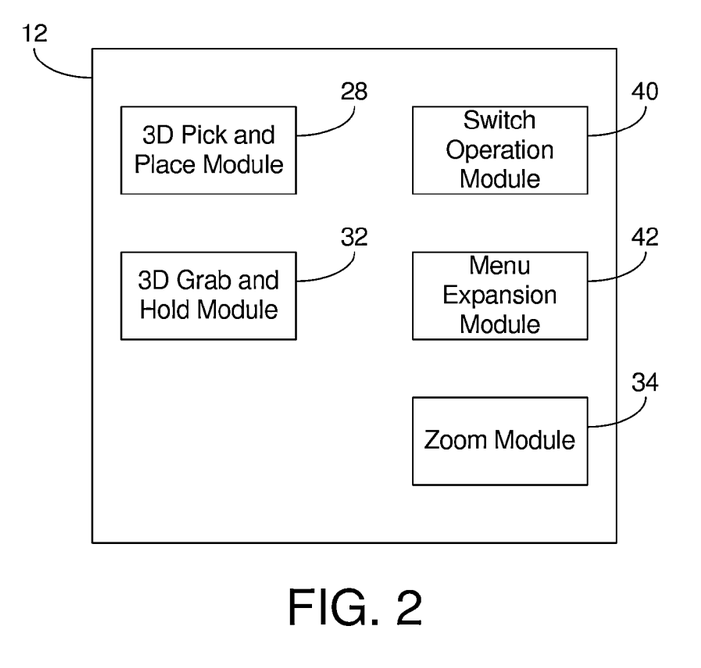
FIG. 2 is a more detailed block diagram of the processor utilized in the system illustrated in FIG. 1 in accordance with another exemplary embodiment.

With reference to FIG. 2, processor 12 preferably includes a number of software modules stored in memory for the interface operations described below. In one embodiment, processor 12 includes a three dimensional pick and place module 28, a three dimensional grab and hold module 32, a zoom module 34, a mouse over module 36, a switch operation module 40, and a menu expansion module 42. Modules 28, 32, 34, 36, 40 and 42 can be stored as instructions on a computer readable medium. Each module 28, 32, 34, 36, 40, and 42 receives sense data from sensors 14, 16 and 18 and interprets movements to effectuate the operation. The display signal provided by processor 12 is provided to show the appropriate images on screen and display 50.

Touch screen and display 50 can allow its users to select a menu displayed in two dimensions and expand the nerve into three dimensional space according to a switch operation associated with module 34. The expansion can be done by touching and pulling the menu back into three dimensional space. In three dimensional space, the menu can have three dimensional features.

In one embodiment, processor 12 according to module 34 analyzes the location of the finger in the XY plane of the object. If the location matches the location of a two dimensional object capable of three dimensional attributes and the object is brought along the Z axis a switch operation is performed on display 50 and three dimensional attributes are displayed. Processor 12 provides three dimensional attributes to be displayed on touch screen and display 50. Three dimensional attributes allow more information to be displayed about the object, symbol, or warning. The object can be returned to a two dimensional mode by bringing it back to the XY plane of the object, (e.g., by moving the object along the Z-axis back to the XY plane).

According to zoom module 34, display 50 can be utilized in accordance with a mouse dial type operation in which, rather than using a mouse dial, the zoom is controlled by placing a finger closer to or further from the object. In one embodiment, to zoom in, the user's finger can be brought towards the object; to zoom out, the user's finger can be brought away from the object. Zoom module 34 preferably analyzes the position of the finger as it changes across the Z axis and processor 12 communicates via the display signal to cause the changes in the zoom in accordance with that movement of finger 60. Individual images or objects can be selected for the zoom operation by touching screen 50 at the position of the image. Alternatively, the entire image can be zoomed. Such an operation provides real time mouse over feedback.

In a preferred embodiment, selected objects as opposed to a scene on the entire display can be selected for three dimensional projection. According to the mouse over module 36, processor 12 analyses the position or location of fingers on touch screen and display 50 to determine a mouse over operation. Such an operation provides real time mouse over feedback. Signals from sensors 14, 16, and 18 of touch screen and display 50 allow processor 12 to determine when the finger is approximately over an object. When this occurs, three dimensional attributes are given to the object. Once the finger is distanced from the object, the object returns to its native two dimensional resolution. Coordinates for the mouse over operation can be provided the same way a mouse coordinates are provided for conventional mouse over effects. According to conventional computer mouse operations, the mouse provides relative motion information (relative coordinates) which is translated into screen coordinates. In a preferred embodiment, screen coordinates are preferably sent directly for use by module 36 since absolute coordinates are being measured by sensors 14, 16, and 18.

According to pick and place module 28, processor 12 analyzes the position or location of fingers on touch screen and display 50 to determine a picking or grabbing operation and a replacement at location in three dimensional space. The pick and place operation follows a human's instinct to physically grab an object, pick it up and place it somewhere else on screen and display 50. Module 28 can preferably sense the closing of fingers in the grab operation associated with the three dimensional location of the object to determine that the object has been grabbed. Further movement of those fingers allows module 28 to determine that the object should be moved in three dimensional space. A releasing motion sensed by continued monitoring of the fingers that grabbed the object can be utilized to determine that the object should be placed in the new location, (e.g. in either three dimensional or two dimensional space).

According to three dimensional grab and hold module 32, processor 12 analyzes the position or location of fingers on a screen and display 50 to determine a picking or grabbing operation and allows the user to move the object in three dimensional space. The object can be rotated in three dimensional space to provide different perspective views for the user. Instructions associated with module 28 can be utilized to implement grab and hold module 32. Similar to the pick and place operation, after the object is released, it can be returned to two dimensional space or three dimensional space. For example, if the object is released at a location associated with a three dimensional portion of screen and display 50, the object can remain at that three dimensional space location. However, if the object is released in a two dimensional portion of the screen and display 50, the object can return to two dimensional space with native two dimensional attributes.

Modules 28 and 32 can be advantageously utilized in navigation applications. For example, screen and display 50 can be utilized in a navigation system and modules 28 or 32 can be utilized to place way points and to track way points along a navigation route. Each way point can be symbolically represented and can include attributes reminding the pilot of certain actions to be taken when the aircraft approaches. These attributes can be three dimensional or two dimensional attributes. When the aircraft approaches a particular way point, system 10 can automatically provide the three dimensional attributes on display 50. In addition, the objects can be moved to other locations on the route and dropped to other portions along the route in accordance with a grab and hold operation and/or a pick and place operation. In addition, a two dimensional way point once touched can be provided with three dimensional attributes in accordance with a switch operation.

Menu expansion module 42 allows the user to review stacked windows displayed in three dimensions and hold a selected window and slide it away from that stack. Processor 12 analyzes the signals from sensors 14, 16, and 18 of touch screen and display 50 to determine the selection or grabbing of a window in a stack and the movement of that window away from the stack. The grabbing or selection of the window can be determined using similar instructions to those used in module 28.

According to one exemplary embodiment, critical weather information could be selected from a weather radar display using system 10. The weather information could be separated from other non-critical weather information and pulled to a different position in three dimensional space for analysis. Further, certain warnings associated with critical weather information could be selected and brought into three dimensional space, changing from a two dimensional warning to a three dimensional warning. The three dimensional warning would have the ability to provide additional information about the warning. In another embodiment, the weather information could be separated from ground clutter and viewed separately from the ground clutter. In addition, certain types of warnings or critical weather could be automatically displayed in three dimensions. Weather information is discussed below with reference to FIGS. 7A-B.

Figure 3:
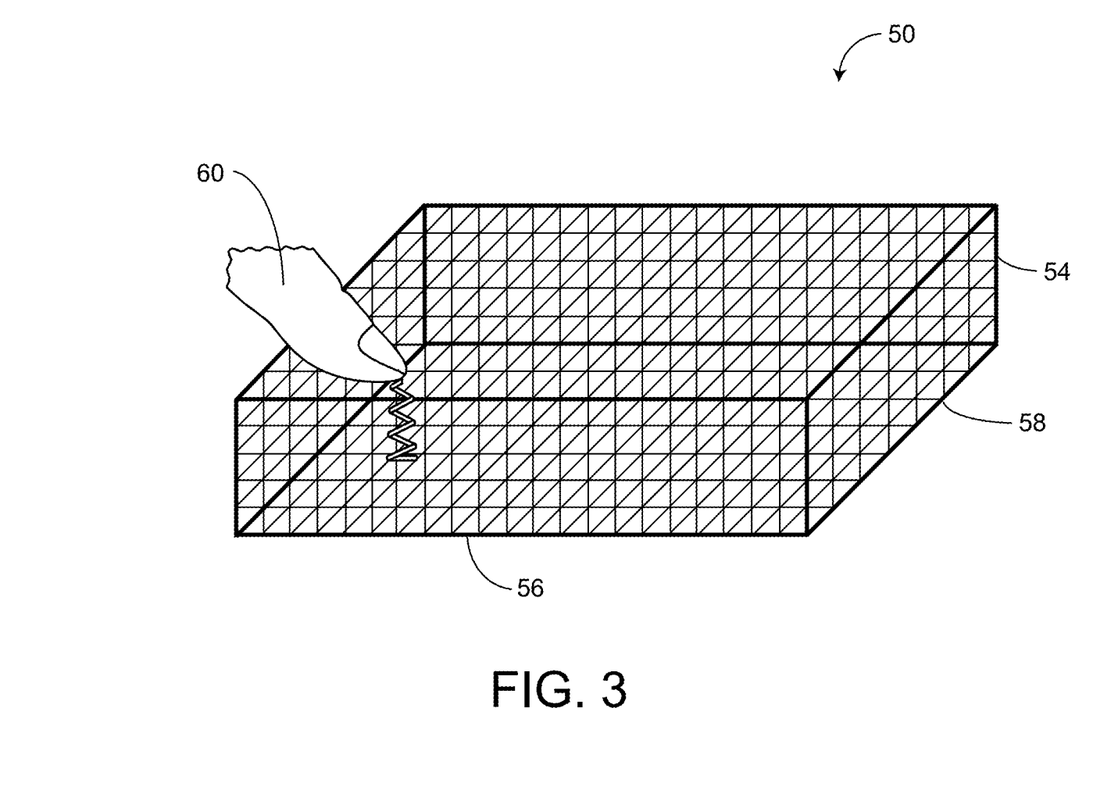
FIG. 3 is a perspective view drawing of a touch screen for use in the system illustrated in FIG. 1.

With reference to FIG. 3, display and panel 50 includes a Y axis 56 and an X axis 58. X axis 56 and Y axis 58 define the XY plane associated with the surface of screen and display 50. A Z axis 64 extends perpendicularly from the XY plane. A finger 60 can be provided above the XY plane. The position and movement of finger 60 are sensed via sensors 14, 16 and 18, The position and movement are used to determine the operation to in three dimensional space above touch screen and display 50 for the interface.

Alternatively, multiple fingers similar to finger 60 can be sensed. One or more of modules 28, 32, 34, 40 and 42 can be utilized by various operations, including the operations described in FIGS. 5 and 6. For example, the operation described in FIG. 6 can utilized instructions associated with module 28 and module 40. For example, module 42 can include operations from module 28, 32 and 40.

Module 32 allows a user to grab and hold an object. The grab and hold object operation can also allow the user to rotate or otherwise manipulate the object in three dimensional space. Touch screen and display 50 is utilized to provide the location of one or more fingers for sensing the grabbing and holding motion.

Figure 4:
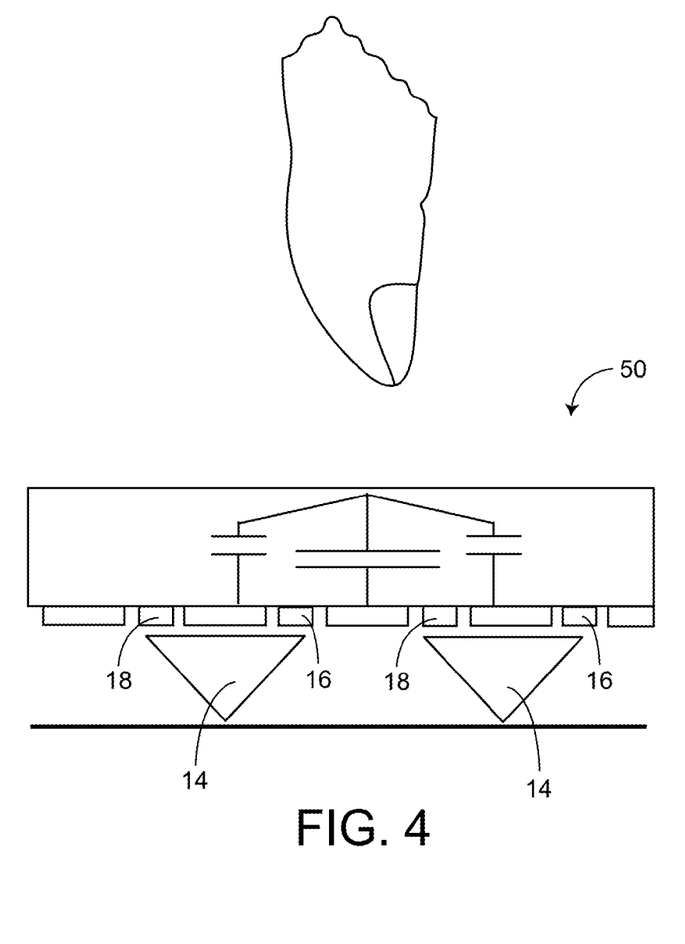
FIG. 4 is a drawing of a portion of the touch screen illustrated in FIG. 3 in accordance with another exemplary embodiment.

With reference to FIG. 4, sensors 16 and 18 are preferably infrared transmitting/sensing devices and sensor 14 is preferably a high frequency ultrasound transmitter receiver. Three dimensional touch sensing can be achieved in the XY plane via sensors 16 and 18 and in the Z axis by sensors 18. The sensing of a finger 60 in three dimensional space allows for design of interfaces using three dimensional motions of the finger. In addition, screen and display 50 can also include surface touch sensitivity such as by using a capacitive touch screen for sensing touches directly in the XY plane.

Figure 5:
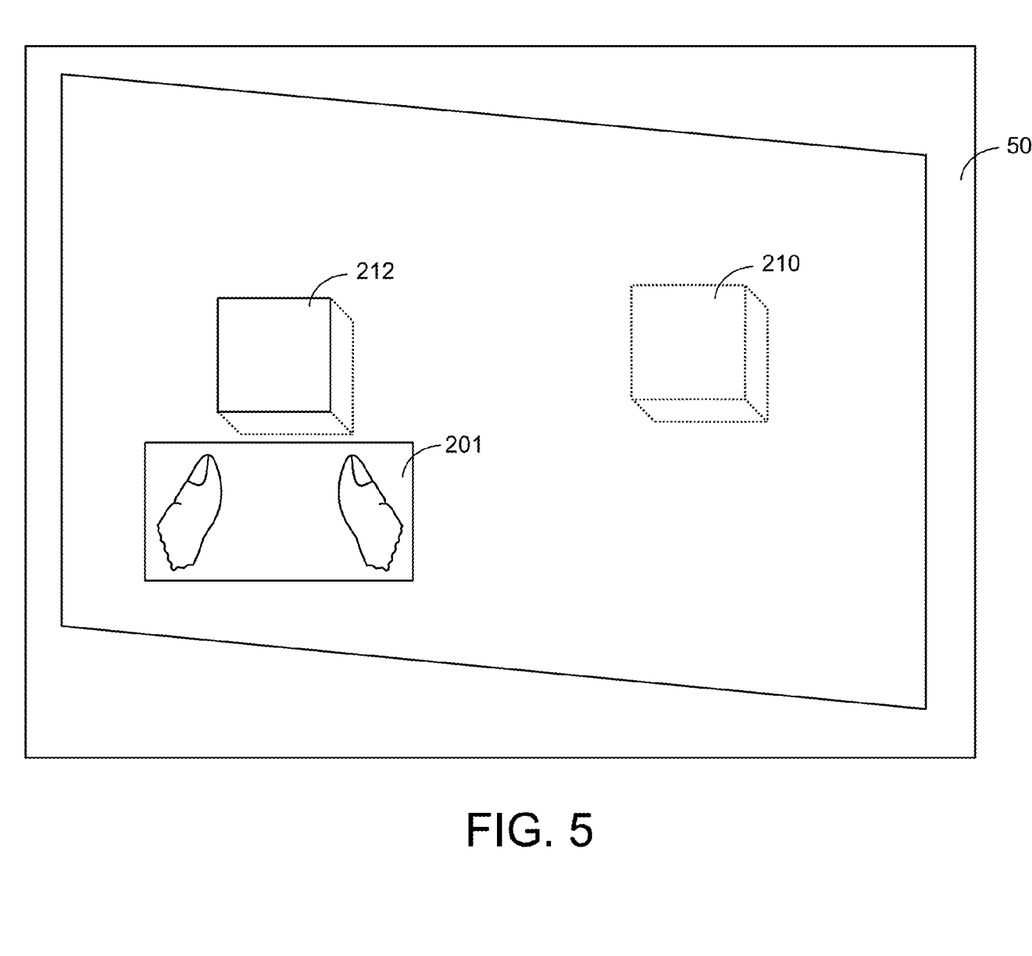
FIG. 5 is a drawing showing a pick and placement operation in accordance with an exemplary embodiment.

With reference to FIG. 5, a finger 200 and thumb 20 can be utilized to grab and hold object 212 in three dimensional space according to module 32. Object 212 can then be placed in another place 210 by releasing object 212 after moving it to space 210 according to module 28. The natural grab and hold motion to pick up object 212 and place it at another place 210 on screen 50 is intuitive to a user.

Figure 6:
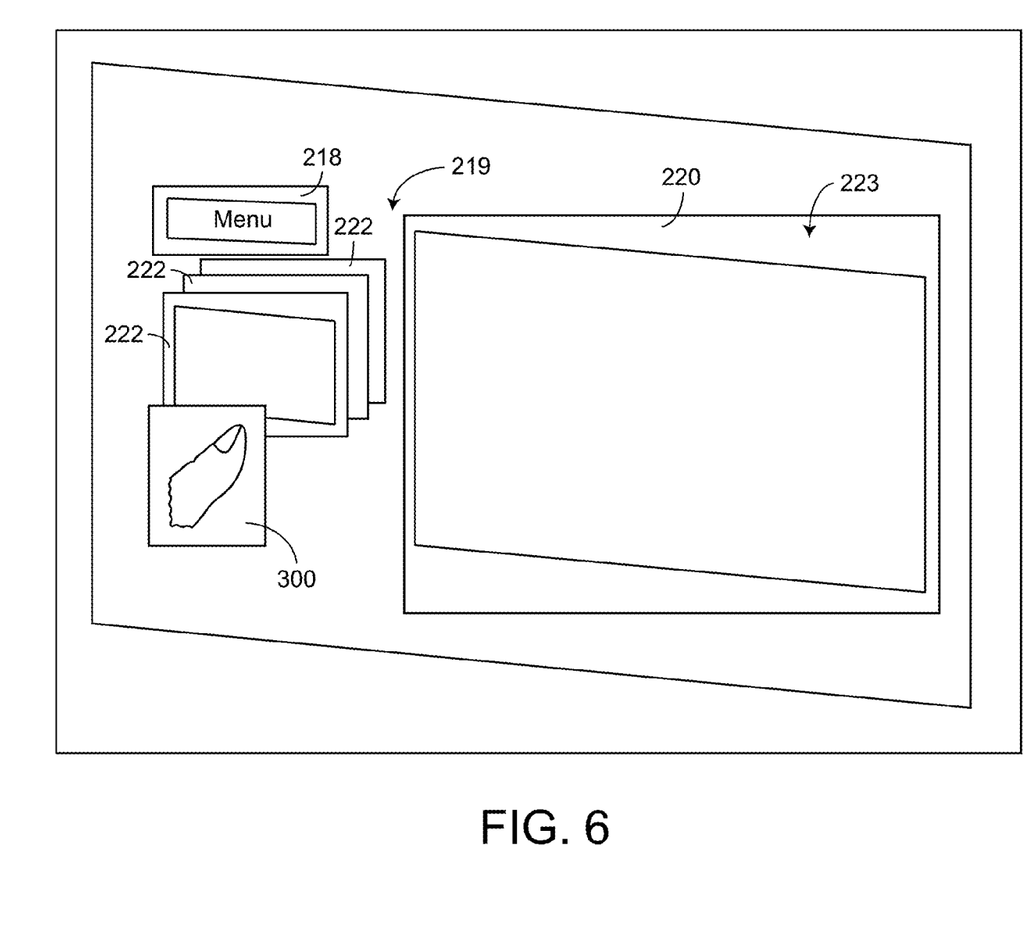
FIG. 6 is a drawing showing a menu expansion operation in accordance with another exemplary embodiment.

With reference to FIG. 6, a finger 300 can be positioned over a menu 218 to expand menu 218 according to module 42. As menu 218 expands, a stack 219 of windows 222 is displayed in three dimensional space. Finger 300 can be used to page through windows 222 and grab a selected window 220 and slide it to another position, such as position 223. Once a window is slid from stack of windows 222, window 220 can be zoomed using a zoom operation or can be automatically zoomed to provide a larger image of window 220.

Figure 7A:
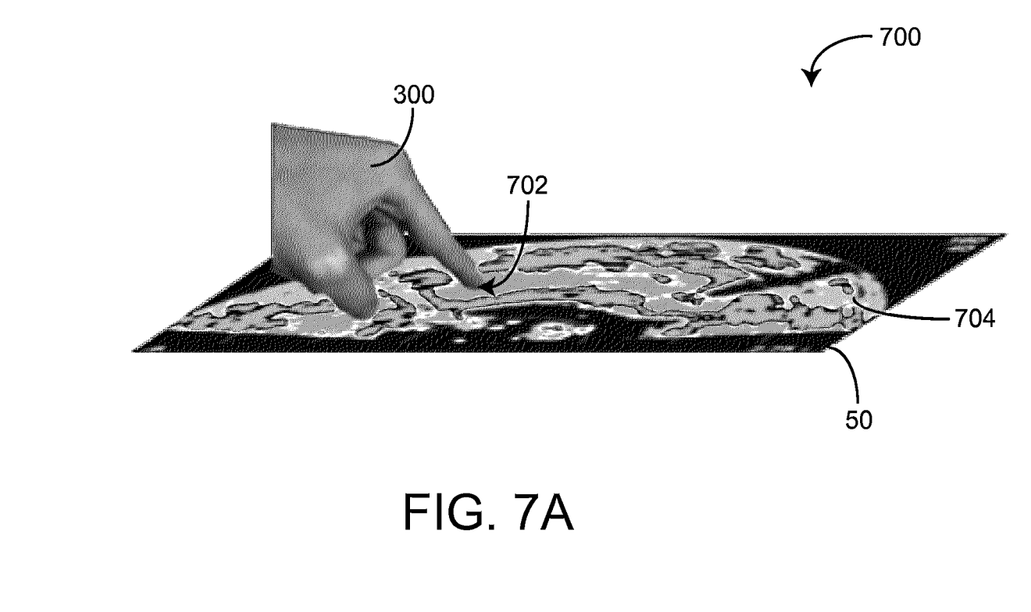
FIGS. 7A-B are a drawings showing the separation of weather information in accordance with yet another exemplary embodiment.
Figure 7B:
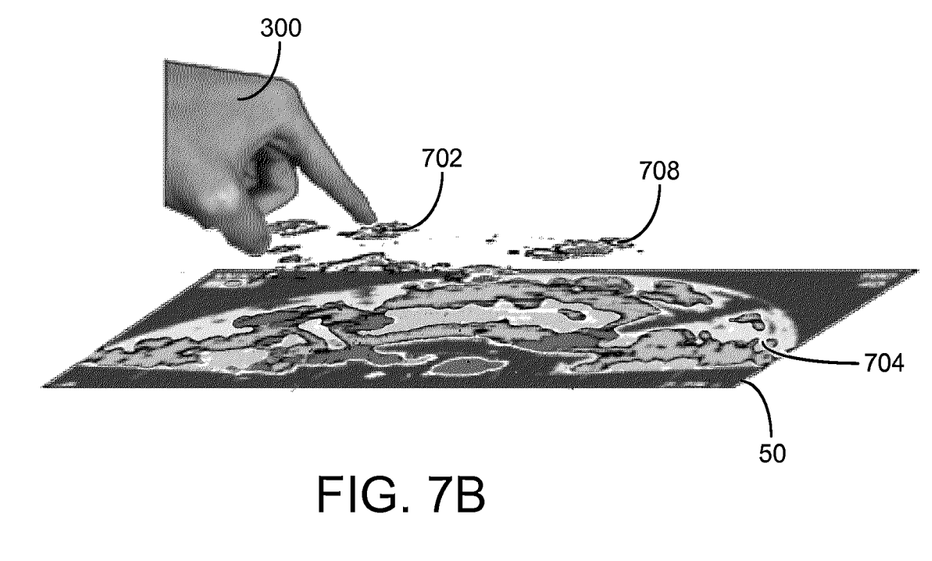

With reference to FIGS. 7A-B, weather information 700 can be provided on screen and display 50. Weather information 700 includes critical weather information 702 and ground clutter 704. Finger 300 can be used to separate critical weather information 702 from ground clutter 704 by touching screen 50 and pulling away in accordance with a mouse over operation, a grab and hold operation, and/or a pick and place operation. Critical weather information 708 can also be automatically projected in three dimensional space based upon criteria related to the weather's hazard level or proximity to flight path. The provision of weather information 702 and 708 in three dimensional advantageously provides better visibility.

Figure 8A:
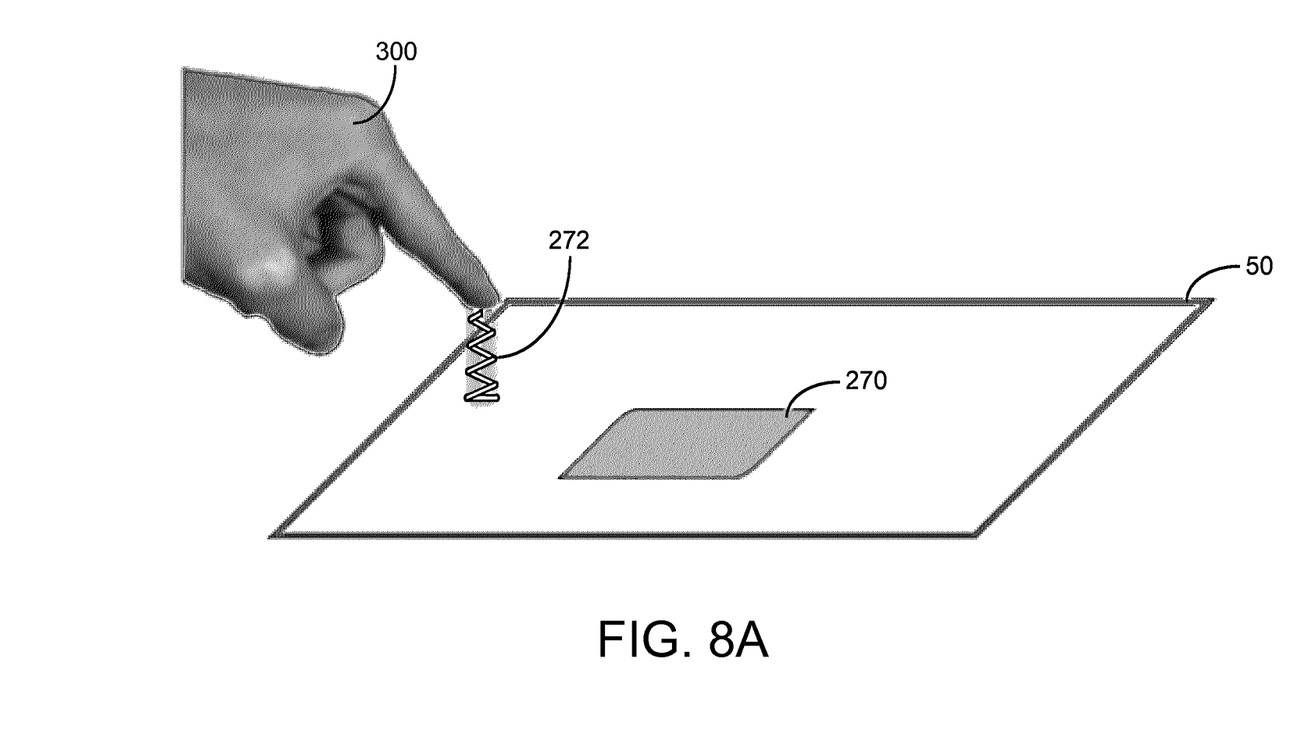
FIGS. 8A-C are drawings showing the mouse over operation in accordance with an exemplary embodiment.
Figure 8B:
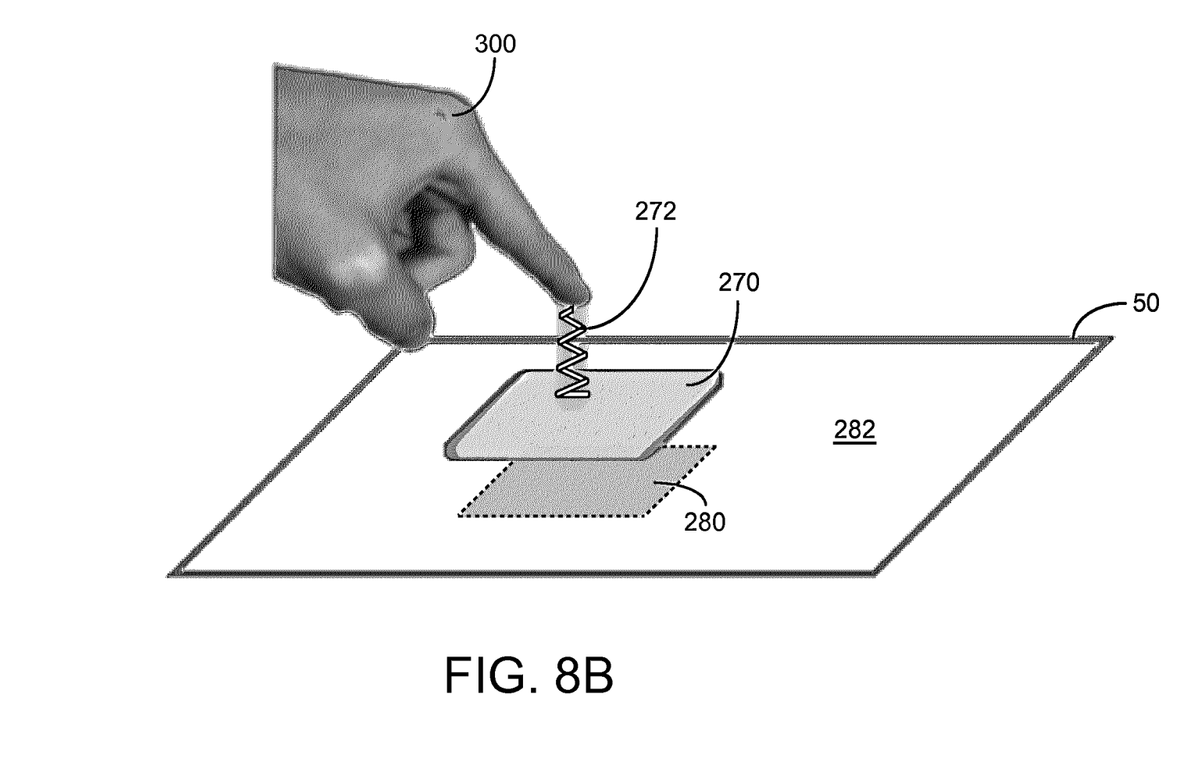
Figure 8C:
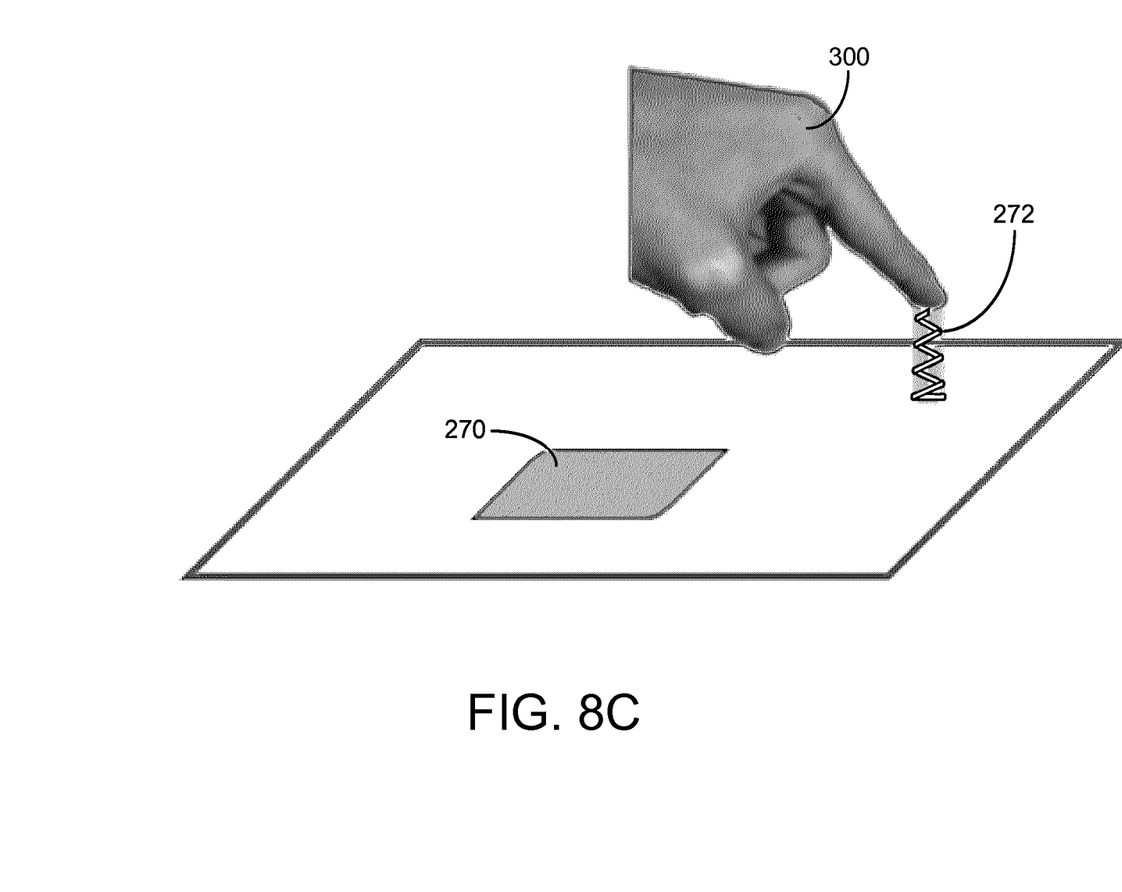

With reference to FIGS. 8A-C, a finger 300 can be positioned over screen and display 50 at a distance 272 (filtered field of detection). When finger 300 is positioned over an object 270 at a distance 272, object 270 obtains three dimensional attributes according to mouse over module 36. Alternatively or in addition, object 270 can be enlarged or raised above a surface 282 of display 50. (Distance 272 is the distance between surface 282 and finger 300 in FIGS. 8A-C). A shadow 280 can also be displayed on surface 282 of display 50 as object 270 obtains three dimensional attributes. As finger 300 is moved away from object 270, object 270 can return to its original position. With three dimensional characteristics, more information can be displayed about object 270.

Animations for touch screen and display 50 are dependent on the application. Exemplary applications for operations on touch screen and display 50 are discussed below.

Mouse Over Events or Operations; Absolute coordinates are measured>>screen coordinates are provided to the application>>the application determines the object that the coordinates fall within, if any>>the application sends back the screen pixels that the object occupies>>the system switches those pixels to be displayed in 3D mode (object size enlargement or color highlight are also possible for better visibility)>>the finger moves away from the object>>the backward events are triggered to restore the native 2D resolution of the object.

Select and pull events such as a pick and place operation, a grab and hold operation, and a zoom operation: These events are dependent on the third coordinate along the Z axis. The event does not start until a touch event is occurred: The operator touches an object on the touch panel>>the application determines the object and the occupied pixels>>Z axis coordinate measurement is set to Active with the base coordinate is set to zero upon touch>>relative motion away from the screen triggers the pixels to be displayed in 3D mode>>at the same time, animation renders possible gradual shadowing (below the object) and object size enlargement.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific displays, sensors and operations processes are mentioned, other interface devices and steps can be utilized. Various changes may be made to the details disclosed without departing from the spirit of the invention which is defined by the following claims.

What is claimed is:

1. An interface for a system having an X, Y, and Z axis and including a three dimensional display and a three dimensional touch screen, the three dimensional displaying two dimensional images in an XY plane at Z equal to zero, the interface comprising:

processing electronics configured for receiving information from the three dimensional touch screen and determining at least one of a grab and hold operation for an object displayed in three dimensional space, a pick and placement operation for the object in three dimensional space, and a mouse over operation wherein the object in a native two dimensional state gains three dimensional attributes when a finger is near the object and returns to the native two dimensional state when the finger moves away from the object, wherein the three dimensional display provides a two dimensional image of weather information, the weather information including critical weather and ground clutter, wherein the object is the critical weather and is displayed above the XY plane at Z equals zero in three dimensions and is separated from the ground clutter in response to the mouse over operation, the grab and hold operation or the pick and place operation, wherein the mouse over operation, the grab and hold operation or the pick and place operation is initiated by touching the XY plane at Z equals zero.

2. The interface of claim 1, wherein the three dimensional display provides the critical weather based upon severity of weather.

3. The interface of claim 1, wherein a critical alert associated with the critical weather is provided in three dimensional space by the three dimensional display and a menu expansion operation can provide additional information regarding the critical alert.

4. The interface of claim 3, wherein the critical alert can be moved using the pick and placement operation.

5. The interface of claim 4, wherein the display provides a map and buttons, tabs, and icons can be selected and moved in three dimensional space.

6. The interface of claim 1, wherein the display is an avionics display.

7. The interface of claim 1, wherein the display is a targeting display.

8. The interface of claim 1, wherein the user can choose one of a plurality of windows in a stack and move the window through three dimensional space to a new position in the stack.

9. The interface of claim 8, wherein the interface is provided for a flight display.

10. The interface of claim 1, wherein the user can choose one of a plurality of windows in a stack and slide it away from the stack.

11. A method of using a three dimensional display and three dimensional touch screen, the method comprising:
receiving detection signals from the three dimensional touch screen;
determining a movement of a finger from the detection signals; and
moving an object displayed on the three dimensional display in response to the movement, the object being moved according to at least one of a grab and hold operation for the object displayed in three dimensional space, and a pick and placement operation for the object in three dimensional space, wherein the three dimensional display includes an X axis, a Y axis, and a Z axis and provides a two dimensional image of weather information, the weather information including critical weather and ground clutter, wherein the object is the critical weather and is displayed above an XY plane at Z equals zero in three dimensions and is separated from the ground clutter in response to the grab and hold operation or the pick and place operation, wherein the grab and hold operation or the pick and place operation is initiated by touching the XY plane at Z equals zero.

12. The method of claim 11, wherein the object is moved according to the grab and hold operation.

13. The method of claim 11, wherein the critical weather is displayed based upon proximity to flight path.

14. The method of claim 11, wherein the object is moved according to the pick and place operation.

15. The method of claim 11, wherein the ground clutter remains on the weather image in the XY plane at Z equals zero.

16. The method of claim 11, wherein further information about the critical weather in three dimensions is displayed according to a menu expansion operation.

17. The method of claim 11, further comprising:
providing a zoom operation associated with a finger movement along the Z axis perpendicular to the XY plane of the three dimensional touch screen.

18. The method of claim 11, wherein the critical weather is displayed based upon a hazard level.

19. An apparatus, comprising:
a display for providing images of two dimensional and three dimensional objects, the display having an X axis, a Y axis, and a Z axis;
means for sensing a position and movement in three dimensions; and
means for responding to the position and movement to change an object displayed in two dimensions to an object displayed in three dimensions, wherein the means for responding responds to at least one of a grab and hold operation for the object displayed in three dimensional space, a pick and placement operation for the object in three dimensional space, and a mouse over operation, wherein the object in a native two dimensional state gains three dimensional attributes when a finger is near the object and returns to the native two dimensional state when the finger moves away from the object, wherein the display provides a two dimensional image of a weather information including critical weather and ground clutter, wherein the object is the critical weather and is displayed above the XY plane at Z equals zero in three dimensions and is separated from the ground clutter in response to the mouse over operation, the grab and hold operation or the pick and place operation, wherein the mouse over operation, the grab and hold operation or the pick and place operation is initiated by touching the XY plane at Z equals zero.

20. The apparatus of claim 19 wherein the critical weather is classified as critical weather based upon level of hazard or proximity to a flight path.

\* \* \* \* \*